United States Patent
Sawamoto

(10) Patent No.: US 8,583,136 B2
(45) Date of Patent: Nov. 12, 2013

(54) DEVICE, METHOD, AND SYSTEM FOR ADJUSTING A MOBILE COMMUNICATION SERVICE AREA

(71) Applicant: Fujitsu Limited, Kawasaki (JP)

(72) Inventor: Toshiro Sawamoto, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/689,546

(22) Filed: Nov. 29, 2012

(65) Prior Publication Data

US 2013/0090128 A1    Apr. 11, 2013

Related U.S. Application Data

(63) Continuation of application No. PCT/JP2010/003646, filed on May 31, 2010.

(51) Int. Cl.
  *H04M 3/00*    (2006.01)
  *H04W 4/00*    (2009.01)
  *H04W 24/00*   (2009.01)
  *H04W 72/00*   (2009.01)

(52) U.S. Cl.
  USPC ............. 455/452.2; 455/420; 455/422.1; 455/424; 455/452.1; 455/453

(58) Field of Classification Search
  USPC ........... 455/418–421, 422.1, 423–426, 434, 455/452.1–452.2, 453, 436–451, 456.1, 455/456.3, 456.5–456.6, 500, 507–510, 455/517, 522, 524–526, 550.1, 556.2, 455/560–561, 63.4, 67.11, 558, 562.1; 370/310, 328–329, 338, 341, 252–253, 370/339, 342, 437
  See application file for complete search history.

(56) References Cited

U.S. PATENT DOCUMENTS

| 6,026,081 A   | 2/2000  | Hamabe      |         |
|---------------|---------|-------------|---------|
| 6,104,936 A   | 8/2000  | Kronestedt  |         |
| 6,131,031 A * | 10/2000 | Lober et al.| 455/444 |
| 6,584,318 B2* | 6/2003  | Hakalin et al.| 455/453 |

(Continued)

FOREIGN PATENT DOCUMENTS

| JP | 10-022975 A | 1/1998 |
|----|-------------|--------|
| JP | 10-022975 A | 1/1998 |

(Continued)

OTHER PUBLICATIONS

Siomina, et al., "Enhancing HSDPA Performance via Automated and Large-scale Optimization of Radio Base Station Antenna Configuration," IEEE, 2008, pp. 2061-2065.

*Primary Examiner* — Meless Zewdu
(74) *Attorney, Agent, or Firm* — Arent Fox LLP

(57) ABSTRACT

There are provided a communication device, service-area adjusting method, and mobile communication system capable of accurately executing an optimization algorithm on an actual field. An EMS (a communication device) acquires an index value indicating downstream reception quality of a mobile station in a communication area from the mobile station via a base station in the communication area with respect to each mobile station. Then, the EMS determines whether to start or end the execution of arithmetic processing of a transmission parameter of each base station in the communication area by comparing a value based on at least any of average communication quality between the base station and mobile station in the communication area, throughput, and received power, which is obtained based on an index value of each mobile station, with a reference value.

12 Claims, 12 Drawing Sheets

(56) References Cited

U.S. PATENT DOCUMENTS

| | | | |
|---|---|---|---|
| 7,043,254 B2 * | 5/2006 | Chawla et al. | 455/456.1 |
| 7,106,712 B2 * | 9/2006 | Hamabe et al. | 370/332 |
| 7,885,608 B2 * | 2/2011 | Nilsson et al. | 455/69 |
| 8,169,933 B2 * | 5/2012 | Srinivasan et al. | 370/253 |
| 2004/0077354 A1 * | 4/2004 | Jason et al. | 455/450 |
| 2005/0254455 A1 | 11/2005 | Plehn et al. | |
| 2006/0111137 A1 * | 5/2006 | Mori et al. | 455/522 |
| 2009/0052330 A1 * | 2/2009 | Matsunaga et al. | 370/242 |
| 2009/0219865 A1 * | 9/2009 | Salzer et al. | 370/329 |
| 2010/0015926 A1 * | 1/2010 | Luff | 455/67.13 |
| 2010/0037284 A1 | 2/2010 | Sachs | |
| 2011/0081897 A1 * | 4/2011 | Beattie et al. | 455/418 |

FOREIGN PATENT DOCUMENTS

| | | |
|---|---|---|
| JP | 2006-505978 A | 2/2006 |
| JP | 2006-505978 A | 2/2006 |
| JP | 2008-547354 A | 12/2008 |
| JP | 2008-547354 A | 12/2008 |
| WO | WO 99/17576 A1 | 4/1999 |

\* cited by examiner

US 8,583,136 B2

DEVICE, METHOD, AND SYSTEM FOR ADJUSTING A MOBILE COMMUNICATION SERVICE AREA

CROSS-REFERENCE TO RELATED APPLICATION

This application is a continuation application of International Application PCT/JP2010/003646, filed on May 31, 2010, and designating the U.S., the entire contents of which are incorporated herein by reference.

FIELD

The present invention relates to a technology to adjust a service area of a base station in a mobile communication system.

BACKGROUND

In a mobile communication system, a telecommunications carrier, which provides services, preliminarily sets a transmission parameter of a wireless base station (hereinafter, simply referred to as a "base station") at the start of a service so as to obtain a desired service area (cell coverage) in a predetermined communication area including a plurality of base stations. A transmission parameter of a base station includes, for example, an antenna tilt angle (an antenna inclination angle) of the base station, transmission power, an azimuth (an angle of the vertical axis of the antenna), and an antenna pattern (antenna directivity), etc. As a method for arithmetic processing of such a transmission parameter, for example, an optimization algorithm is known.

For example, as a publicly-known method to optimize an antenna tilt angle, there is a method to quantify a decrease in inter-cell interference and a decrease in coverage area of a target cell and calculate a ratio of the decrease in coverage area of the target cell to the decrease in interference. In this method, a candidate inclination angle of a base station antenna at which the ratio of the decrease in coverage area of the target cell to the decrease in interference becomes maximum is identified as an optimum tilt angle of the base station antenna.

Furthermore, as a publicly-known method to optimize an antenna configuration, there is an annealing algorithm for adjusting a parameter of the antenna configuration while updating a temperature T so that an average throughput in each predetermined user distribution becomes optimal.

After a transmission parameter of a base station has been set and the operation of a system has been commenced, an initially-planned optimum service area is sometimes not obtained later on by a change of a system operational condition, a change of the wireless environment (for example, a change of a path loss due to a new building), and the like. Therefore, to maintain the quality of a communication service to a user of a mobile communication system, a telecommunications carrier regularly or irregularly executes the above-described optimization algorithm on a computer and adjusts the transmission parameter.

Patent Literature 1: International Publication Pamphlet No. WO 1999/017576
Non Patent Literature 1: Iana Siomina and Di Yuan, Enhancing HSDPA Performance via Automated and Large-scale Optimization of Radio Base Station Antenna Configuration, IEEE, 2008

However, it is difficult to automatically optimize a transmission parameter on an actual field by using the related optimization algorithm. Because, if an optimization algorithm for optimization of a tilt angle of each base station is constantly executed on the actual field, an optimization process is performed even under a situation where there is no need to perform the optimization process, and this causes a problem that the optimization algorithm is not properly executed or is not converged.

SUMMARY

According to an aspect of the embodiments, a communication device for adjusting a service area to a mobile station in a predetermined communication area including a plurality of base stations having a transmission-parameter adjusting function is provided. The communication device includes: (A) a data acquiring unit that acquires an index value indicating downstream reception quality of a mobile station in the communication area from the mobile station via a base station in the communication area with respect to each mobile station; and (B) a determining unit that determines whether to start or end the execution of arithmetic processing of a transmission parameter of each base station in the communication area by comparing a value based on at least any of communication quality between the base station and mobile station in the communication area, throughput, and received power, which is obtained based on the index value of each mobile station, with a reference value.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the description of embodiments below, a "predetermined communication area" is a certain geographic area including one or more base stations (eNB: evolved Node B), and denotes a target area in which an optimization process to optimize a transmission parameter of each base station is performed. Furthermore, a "service area" denotes not a geographic fixed area but an area in which a mobile station (UE: User Equipment) can perform communication with a base station, i.e., an area in which a user of the mobile station can receive a service. Moreover, a base station and a mobile station are arbitrarily abbreviated to "eNB" and "UE", respectively.

(1) First Embodiment (1-1) Mobile Communication System

Figure 1:
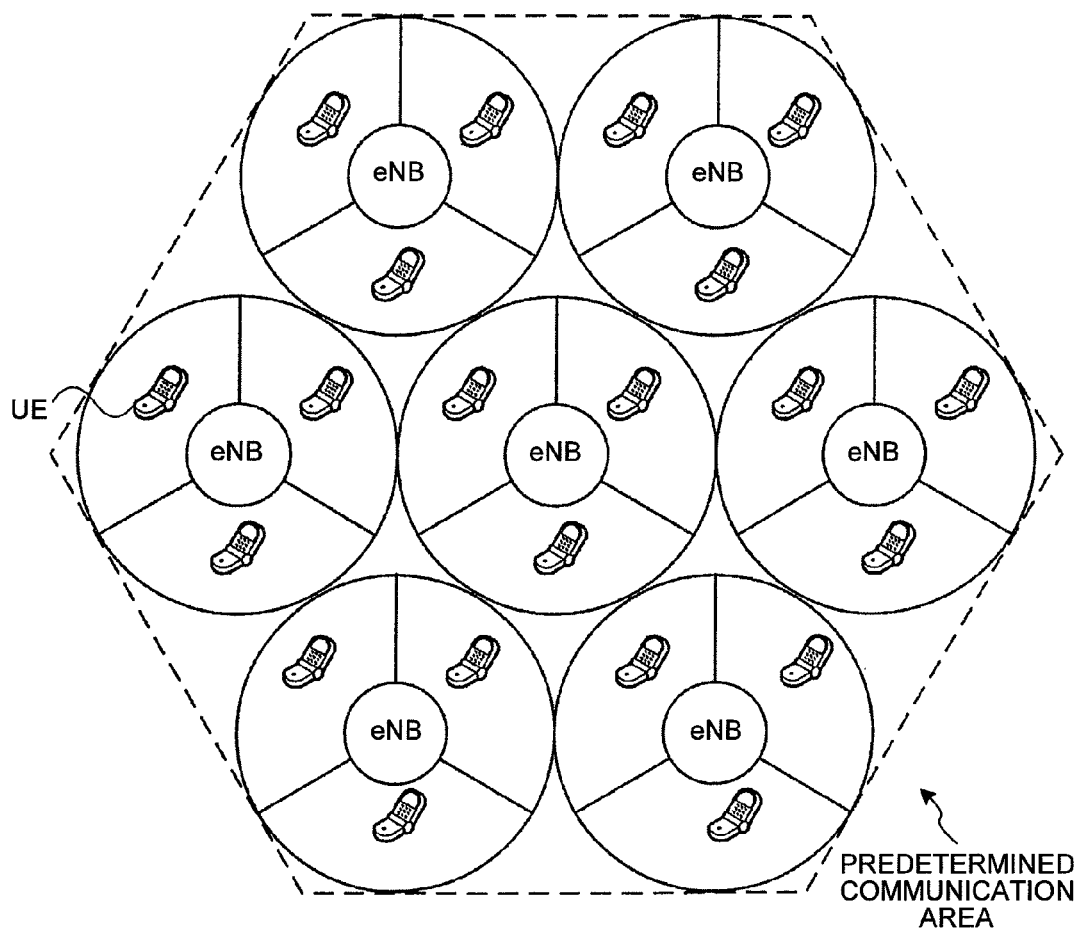
FIG. 1 is a diagram illustrating an example of a predetermined communication area in a first embodiment.

In a mobile communication system according to a present embodiment, with respect to each predetermined communication area, an optimization process to optimize respective transmission parameters of a plurality of base stations (eNB: evolved Node B) included in a communication area is performed so as to obtain as broad a range of service area as possible within the communication area. As a result of the optimization process, a service area to a mobile station within the communication area is adjusted. The transmission parameters include, for example, an antenna tilt angle (an antenna inclination angle) of each base station, transmission power, an azimuth (an angle of the vertical axis of the antenna), and an antenna pattern (antenna directivity), etc. In the present embodiment, there is described a case where an object of the optimization process is a tilt angle as an example. FIG. 1 illustrates an example of a predetermined communication area. In this example, seven 3-sector base stations are included in the communication area, and twenty-one cells (respective tilt angles of twenty-one antennas) are objects of the optimization process.

If an optimization algorithm (an optimization process) for optimization of a tilt angle of each base station is constantly executed, the optimization process is performed even under a situation where there is no need to perform the optimization process, and this may cause a problem that the optimization algorithm is not properly executed or is not converged.

Therefore, in the mobile communication system according to the present embodiment, instead of constantly executing the optimization algorithm, a condition for the start or end of the optimization process to optimize a transmission parameter of each base station in a communication area is set based on the average downstream reception quality (the average reception quality) of mobile stations in the communication area. Namely, the start of the execution of the optimization algorithm will be applied on the condition that the average reception quality of mobile stations in the communication area has deteriorated to below a reference value. Furthermore, the end of the execution of the optimization algorithm will be applied on the condition that the average reception quality of mobile stations in the communication area has become equal to or higher than the reference value and the reception quality has been improved. The reference value here is set, for example, at the start of the operation of the mobile communication system or at the time of maintenance after the start of the operation based on a value calculated from an average distribution of mobile stations in the communication area by a computer or a value obtained by statistical processing long-term average reception quality samples.

(1-2) System Configuration

Figure 2:
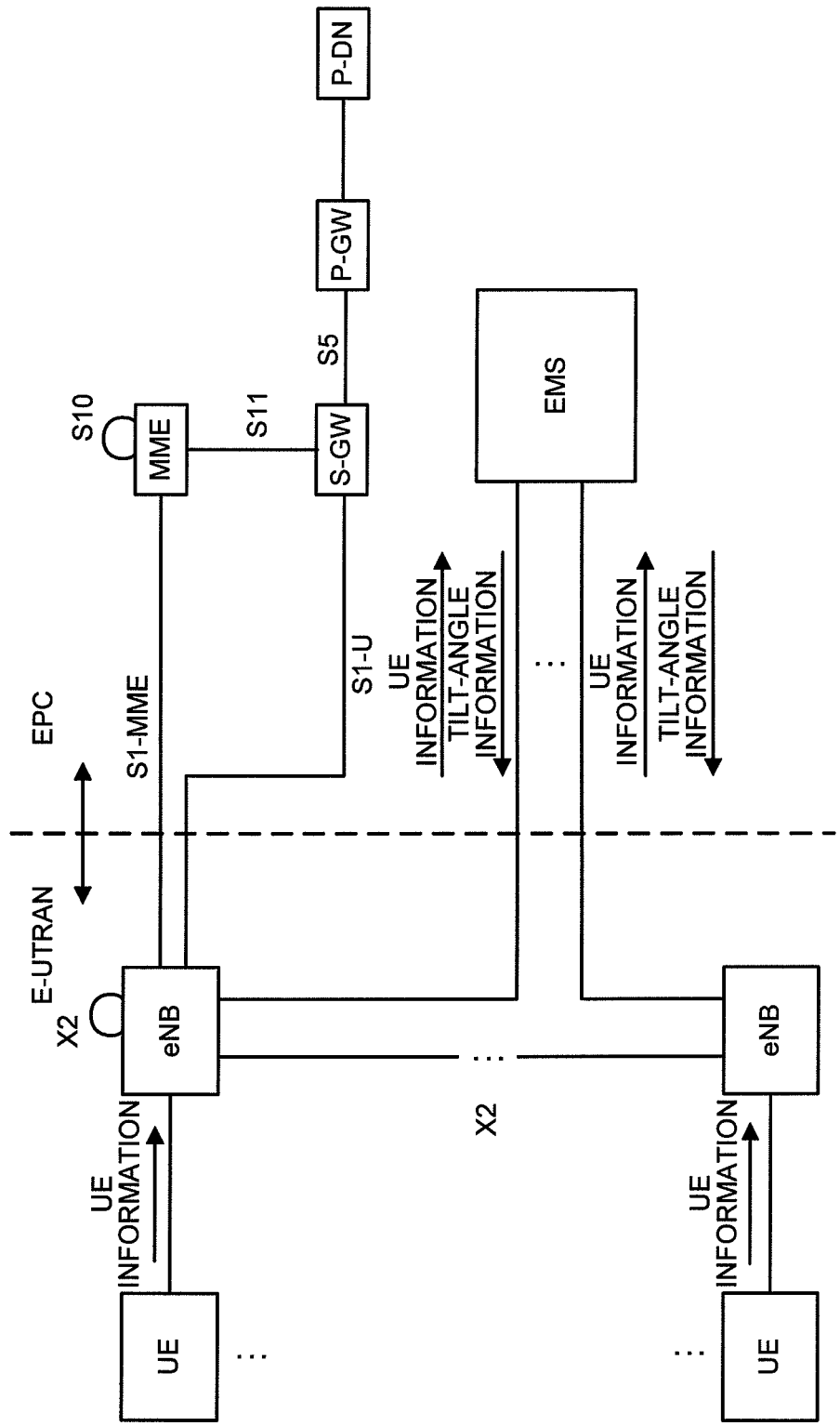
FIG. 2 is a system configuration diagram of a mobile communication system according to the first embodiment.

FIG. 2 is a system configuration diagram of the mobile communication system according to the present embodiment.

The system configuration illustrated in FIG. 2 is based on LTE (Long Term Evolution) which is a next-generation mobile communication system. In an E-UTRAN (Evolved Universal Terrestrial Radio Access Network) which is a radio access network of the LTE, base stations eNB are connected by an X2 interface. The E-UTRAN is connected to an EPC (Evolved Packet Core) which is a corresponding core network. The EPC includes an MME (Mobility Management Entity), an S-GW (Serving Gateway), a P-GW (Packet Data Network Gateway), and a PDN (Packet Data Network). S1-MME, S1-U, S5, S10, and S11 are interfaces connecting between entities. Furthermore, each base station eNB is connected to an external EMS (Element Management System) by wire or wireless means.

In the system configuration illustrated in FIG. 2, each base station eNB in a communication area acquires information on the downstream reception quality of a mobile station as UE information from a connected mobile station UE. An index value indicating the downstream reception quality includes, for example, an SNR (Signal to Noise Ratio), SIR (Signal to Interference Ratio), SINR (Signal to Interference plus Noise Ratio), and reference-signal reception power (for example, RSRP), etc. measured by the mobile station UE based on a known reference signal such as a pilot signal transmitted from the base station eNB. Such UE information is included in an upstream control signal transmitted from a mobile station to a base station. In what follows, there is described a case where the upstream control signal includes data of a downstream reception SINR (hereinafter, arbitrarily abbreviated to simply an "SINR") as UE information.

UE information collected by each base station eNB is transmitted to the external EMS. Namely, the EMS collects UE information of all UEs in the communication area. The EMS is mounted with an optimization algorithm for optimization of a tilt angle, and determines an adjustment mount of an antenna tilt angle of each base station eNB in the communication area based on the collected UE information. Furthermore, the EMS transmits tilt-angle information indicating an adjustment mount of a tilt angle to each base station eNB in the communication area. Each base station eNB has a tilt-angle adjusting function, and performs a tilt-angle adjusting process based on an adjustment mount of a tilt angle provided by the EMS.

Incidentally, in the mobile communication system according to the present embodiment, an entity that collects UE information and transmits tilt-angle information to each base station eNB is the EMS; however, an entity other than the EMS can be configured to perform the same process. For example, one of the plurality of base stations in a predetermined communication area is set as a master base station, and this master base station can have the same function as the EMS. In this case, the master base station collects UE information from the other base stations in the communication area (here, referred to as "slave base stations") and transmits tilt-angle information to each slave base station. Communication between the master base station and the slave base station is performed via the X2 interface.

(1-3) Configurations of Base Station and EMS

Figure 3:
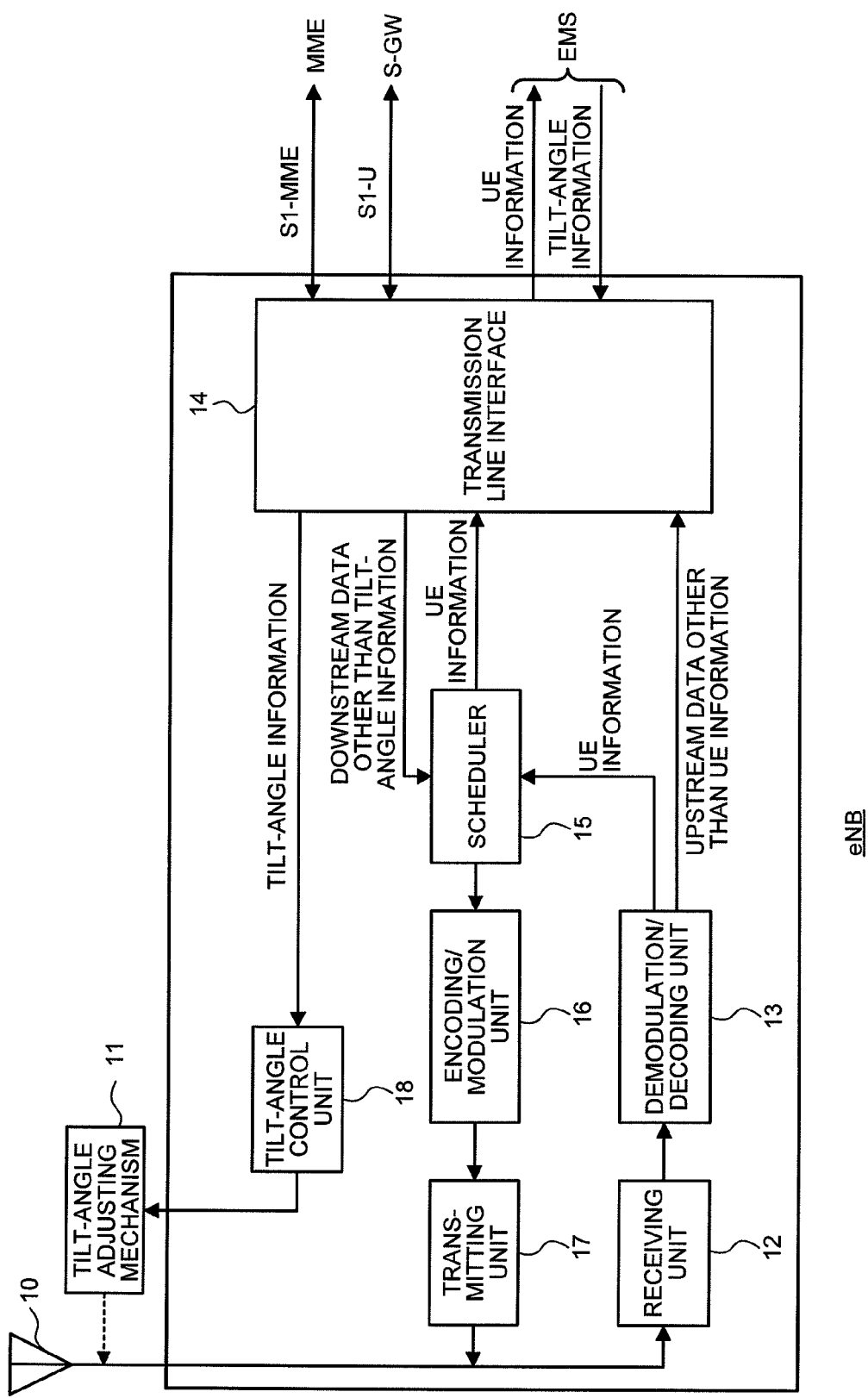
FIG. 3 is a block diagram illustrating a main section of a configuration of a base station according to the first embodiment.
Figure 4:
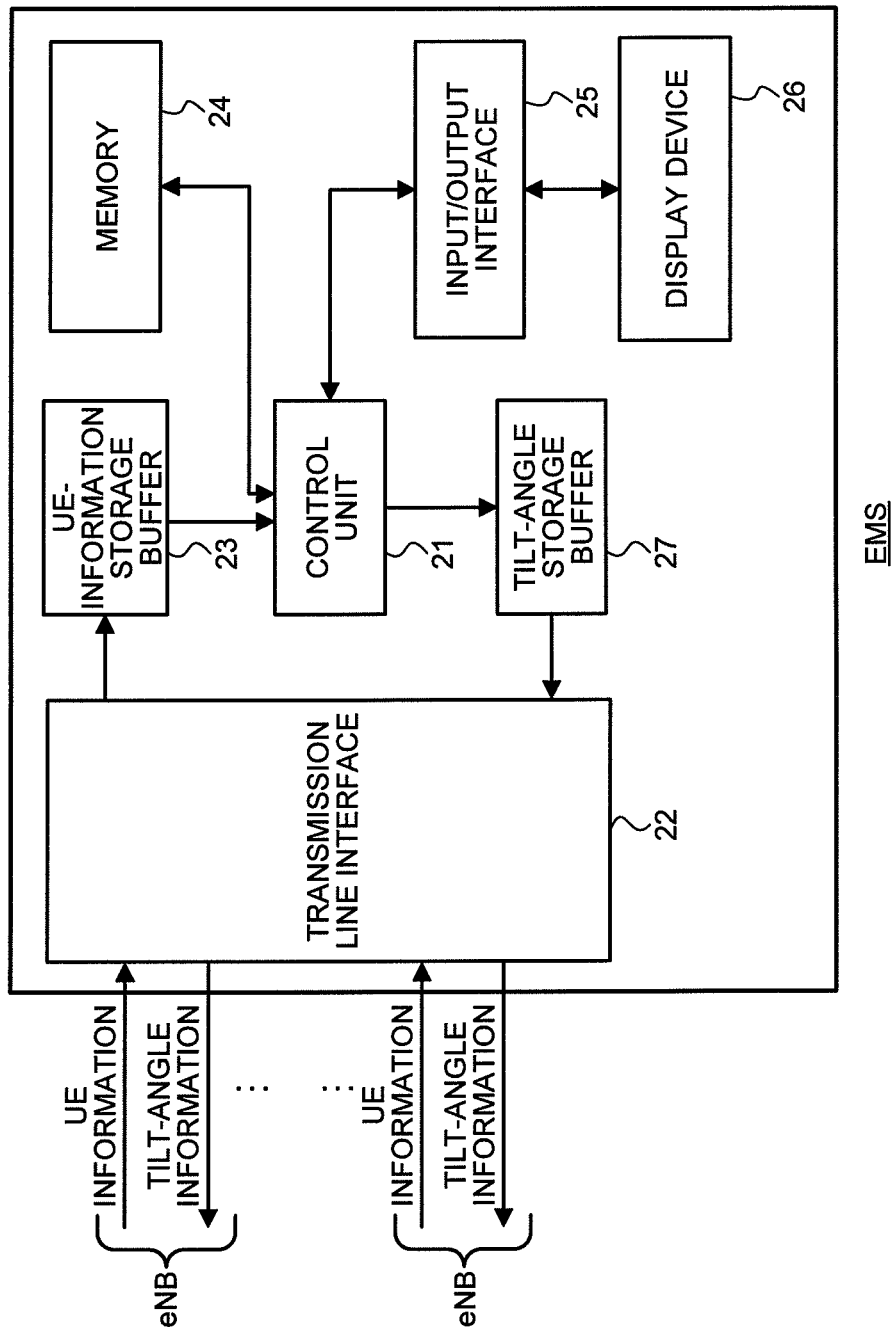
FIG. 4 is a block diagram illustrating a main section of a configuration of an EMS according to the first embodiment.

Subsequently, configurations of the base station and the EMS are explained with reference to FIGS. 3 and 4. FIG. 3 is a block diagram illustrating a main section of the configuration of the base station eNB. FIG. 4 is a block diagram illustrating a main section of the configuration of the EMS.

First, with reference to FIG. 3, the base station eNB according to the present embodiment includes a transmitting and receiving antenna 10, a tilt-angle adjusting mechanism 11, a receiving unit 12, a demodulation/decoding unit 13, a transmission line interface 14, a scheduler 15, an encoding/modulation unit 16, a transmitting unit 17, and a tilt-angle control unit 18.

The receiving unit 12 includes a band-limiting filter, an LNA (Low Noise Amplifier), a local frequency transmitter, a quadrature demodulator, an AGC (Automatic Gain Control) amplifier, and an A/D (Analog to Digital) converter, etc. The receiving unit 12 converts an RF signal from a mobile station that the antenna 10 has received into a digital baseband signal. Furthermore, the receiving unit 12 performs a process of separating a received signal into reference signals, such as a data signal, a control signal, and a pilot signal.

The demodulation/decoding unit 13 performs demodulation and decoding on the data signal and the control signal. At this time, channel compensation of the data signal and the control signal is performed based on a channel estimate obtained from the reference signals into which the received signal has been separated by the receiving unit 12.

UE information (data of a downstream SINR) included in the received control signal is provided to the scheduler 15. The data signal and information on the control signal other than the UE information (i.e., upstream data other than the UE information) are provided to the transmission line interface 14.

The scheduler 15 manages assignment (scheduling) of a radio resource to each mobile station in two dimensions: a temporal axis direction and a frequency axis direction of a radio frame. The scheduler 15 manages data of a downstream SINR of each mobile station, and also reflects the downstream SINR of the mobile station in scheduling of the mobile station and determination of a modulation encoding method for a signal to the mobile station.

The encoding/modulation unit 16 performs encoding and modulation on reference signals such as a data signal, a control signal, and a pilot signal of each mobile station, and multiplexes the data signal, the control signal, and the pilot signals. The transmitting unit 17 includes a D/A (Digital to Analog) converter, a local frequency transmitter, a mixer, a power amplifier, and a filter, etc., and after up-converting the multiplexed transmitting signal from a baseband frequency to a radio frequency, the transmitting unit 17 transmits the transmitting signal into the space through the antenna 10.

UE information (data of a downstream SINR) of each mobile station is transmitted to the external EMS via the transmission line interface 14. Tilt-angle information transmitted from the EMS is provided to the tilt-angle control unit 18 via the transmission line interface 14. The tilt-angle control unit 18 sends a control signal to the tilt-angle adjusting mechanism 11 based on an adjustment amount of a tilt angle indicated by the tilt-angle information.

The tilt-angle adjusting mechanism 11 adjusts a tilt angle of the antenna 10 in response to a control signal from the tilt-angle control unit 18. A publicly-known mechanism can be used as an adjusting mechanism mounted on the tilt-angle adjusting mechanism 11, and detailed description of this mechanism is omitted. As a mechanical mechanism for controlling a tilt angle of an antenna which is actually tilted by a motor driving a member which supports the antenna, for example, there is disclosed in Japanese Laid-open Patent Publication No. 2005-051409. Furthermore, as an electrical mechanism for substantially adjusting the directivity in a direction of a tilt angle of an antenna without actually tilting the antenna by setting a plurality of antenna units in a vertical direction and controlling a phase of power feed to each antenna unit, for example, there is disclosed in Japanese Patent No. 4040042.

Next, with reference to FIG. 4, the EMS as a communication device according to the present embodiment includes a control unit 21 as a determining unit and an adjustment-amount calculating unit, a transmission line interface 22 as a data acquiring unit, a UE-information storage buffer 23, a memory 24, an input/output interface 25, a display device 26, and a tilt-angle storage buffer 27.

The control unit 21 is composed of a microcontroller as a main component. The control unit 21 mainly determines whether a condition for the start or end of an optimization process to optimize an antenna tilt angle of each base station is met or not, and performs the optimization process. An antenna-tilt-angle optimization algorithm (program) has been stored in the memory 24, and the control unit 21 loads the program from the memory 24 and executes the program.

The control unit 21 determines whether to start tho tilt-angle optimization process by sequentially comparing a preset SINR reference value held in the control unit 21 with an average SINR (average reception quality) obtained by averaging UE information (downstream SINRs) stored in the UE-information storage buffer 23. In the description below, the SINR reference value is denoted by $SINR_{th}$, and the average SINR is denoted by $SINR_{ave}$. The $SINR_{ave}$ is obtained by the following equation (1).

$$SINR_{ave} = \frac{\sum_i \sum_j \sum_k SINR[i][j][k]}{\sum_i \sum_j k[i][j]} \quad (1)$$

Incidentally, in the equation (1), it is assumed that i base stations each has j sectors, and k[i][j] mobile stations are connected to each sector, and a downstream reception SINR of each mobile station is an SINR[i][j][k]. In this EMS, mobile-station UE information received from each base station eNB in a communication area via the transmission line interface 22 is held in the UE-information storage buffer 23.

The control unit 21 compares a changing $SINR_{ave}$ with the $SINR_{th}$, and determines whether or not to start or end the execution of the antenna-tilt-angle optimization algorithm based on a result of the comparison. The determination of whether or not to start the execution of the optimization algorithm here is determination of whether or not to start the execution of the optimization algorithm when the execution of the optimization algorithm is not performed. For example, when a downstream average SINR is down from the reference value (i.e., when the average reception quality has deteriorated to below the reference value), the execution of the antenna-tilt-angle optimization algorithm is started. Furthermore, the determination of whether or not to end the execution of the optimization algorithm is determination of whether to start a main-routine process of the optimization algorithm again upon completion of the main-routine process once or to end the execution of the optimization algorithm. For example, when an average SINR has become equal to or higher than the reference value (i.e., when the average reception quality has become equal to or higher than the reference value) upon completion of the main-routine process of the optimization algorithm once, the execution of the optimization algorithm is ended without performing the main-routine process again.

Incidentally, any algorithm can be applied as an optimization algorithm. For example, the above-described publicly-known optimization algorithm can be applied.

Furthermore, for the purpose of avoiding a situation in which the execution of the optimization algorithm is started or ended too much by being excessively affected by a change in an SINR value due to noise, a criterion for judgment of a comparison between $SINR_{ave}$ and $SINR_{th}$ can be based on a criterion formula of $|SINR_{ave} - SINR_{th}| > d$. Here, d is a predetermined margin preliminarily determined based on computer simulation or past measurement results, etc.

An adjustment amount of an antenna tilt angle of each base station, which has been calculated by the optimization algorithm, is stored in the tilt-angle storage buffer 27, and after that, the adjustment amount is transmitted to the base station eNB via the transmission line interface 22. The display device 26 displays thereon contents of control by the control unit 21 (a result of the above-described judgment and a result of the execution of the optimization algorithm, etc.) through the input/output interface 25.

Incidentally, in the present embodiment, a physical amount calculated by the optimization algorithm is an adjustment amount of a tilt angle; alternatively, the physical amount can be a target tilt angle. It is obvious that the both are equivalent.

(1-4) Operation of EMS

Figure 5:
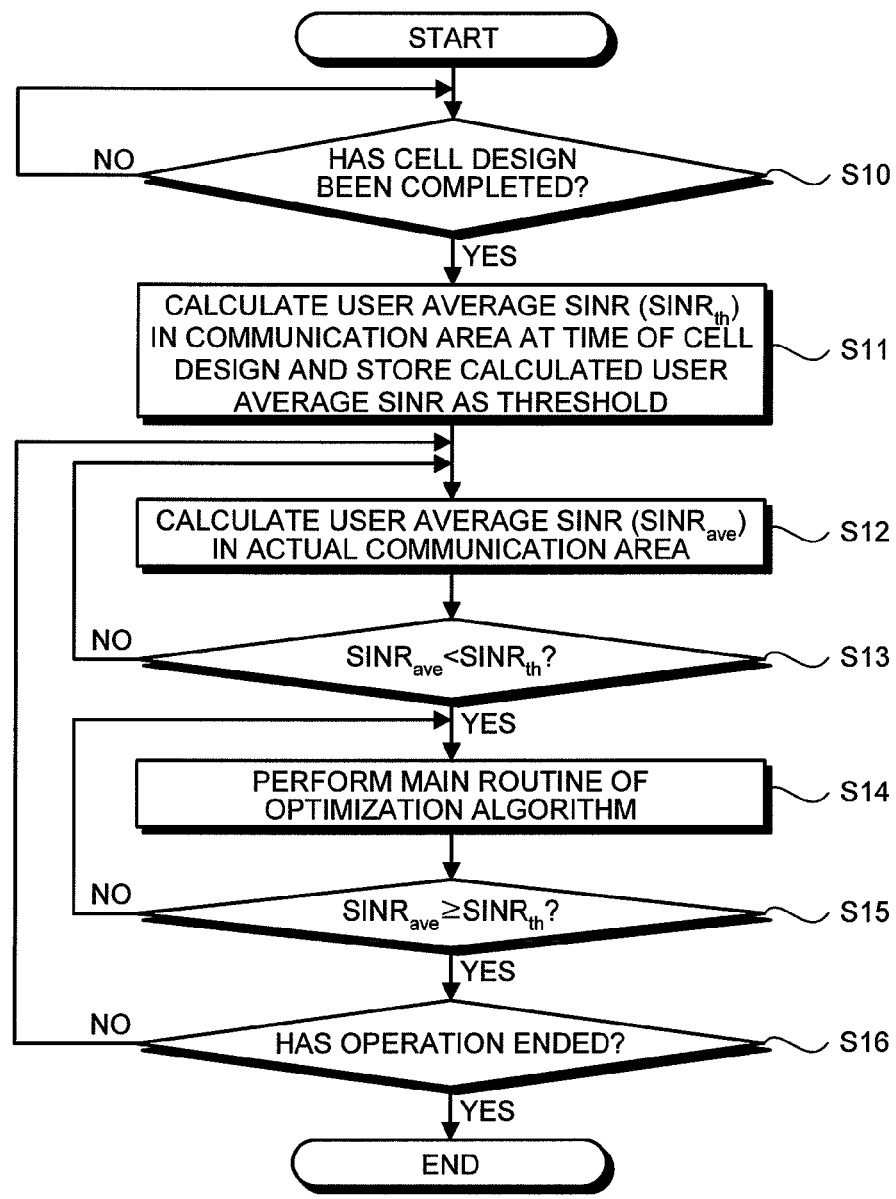
FIG. 5 is a flowchart illustrating operation related to the execution of an optimization algorithm for optimization of an antenna tilt angle of a base station according to the first embodiment.

Subsequently, out of operations of the EMS, operation related to the execution of the optimization algorithm for optimization of an antenna tilt angle of a base station is explained with reference to FIG. 5. FIG. 5 is a flowchart illustrating the operation related to the execution of the optimization algorithm for optimization of an antenna tilt angle of a base station.

In FIG. 5, upon completion of the cell design (Step S10), cell alignment in a communication area and an initial value of a transmission parameter of each base station in the communication area are set for the operation of the mobile communication system. Furthermore, a reference value for determination of whether to start or end the execution of the antenna-tilt-angle optimization algorithm is set in each base station (Step S11). The above processes are typically performed before the mobile communication system is operated on an actual field.

In the mobile communication system according to the present embodiment, with respect to each predetermined communication area, the EMS controls the optimization of a transmission parameter (in the present embodiment, an antenna tilt angle) of each of the plurality of base stations in the communication area. Then, when the operation of the mobile communication system according to the present embodiment is started on the actual field, the EMS collects UE information (data of a downstream SINR measured by each mobile station) transmitted from each base station in the communication area, and sequentially calculates an average SINR ($SINR_{ave}$) of mobile stations in the communication area (Step S12). When it is determined that the average SINR is equal to or higher than a reference value ($SINR_{th}$) ($SINR_{ave} \geq SINR_{th}$, NO at Step S13), the EMS returns to Step S12 without performing the optimization of the antenna tilt angle of the base station, and continues the monitoring by determination based on an average SINR.

On the other hand, when it is determined that the average SINR is lower than the reference value ($SINR_{ave} < SINR_{th}$, YES at Step S13), the EMS performs a main-routine process of the optimization algorithm for optimization of the antenna tilt angle of the base station (Step S14). Then, when having completed the main-routine process of the optimization algorithm once, the EMS determines whether to start the main-routine process again or to end the execution of the optimization algorithm (Step S15). Namely, when the average SINR is lower than the reference value ($SINR_{ave} < SINR_{th}$), the EMS returns to Step S14, and again performs the main-routine process of the optimization algorithm for optimization of the antenna tilt angle of the base station. When the average SINR is equal to or higher than the reference value ($SINR_{th}$) ($SINR_{ave} \geq SINR_{th}$), as long as the operation is continued (NO at Step S16), the EMS ends the execution of the optimization algorithm without continuously performing the main-routine process, and returns to Step S12. Then, the EMS continues the monitoring by determination based on an average SINR.

As described above, in the mobile communication system according to the present embodiment, at the start or end of the execution of the optimization algorithm for optimization of an antenna tilt angle of each of the plurality of base stations in a predetermined communication area on an actual operating field, the EMS collects data of respective downstream reception qualities of mobile stations in the communication area. When the average reception quality calculated based on the collected data (for example, downstream SINRs of mobile stations) has deteriorated to below a reference value, the EMS starts the execution of the optimization algorithm. Furthermore, as a result of the execution of the optimization algorithm, when the average reception quality has become equal to or higher than the reference value, the EMS ends the execution of the optimization algorithm. Namely, in the mobile communication system according to the present embodiment, a condition for the start or end of an optimization process to optimize a transmission parameter of each base station in the communication area is set based on the average reception quality of the mobile stations in the communication area. Therefore, in the mobile communication system according to the present embodiment, the problem that the optimization algorithm is not properly executed or is not converged is avoided, and also, when the radio propagation environment has deteriorated due to a new building or the like, the optimization algorithm is immediately executed. In short, the optimization algorithm is executed accurately.

Incidentally, one-time main routine of the above-described optimization algorithm could require a long time, for example, about a few hours; therefore, the EMS can be configured to check whether the condition at Step S13 is met or not during the execution of the main routine. In this case, when the condition at Step S13 is not met, the execution of the main routine is aborted.

In the embodiment described above, at the time of determination of whether to start or end of the execution of the optimization algorithm, the average reception quality obtained by averaging respective downstream reception qualities (downstream SINRs) of mobile stations is compared with a reference value; however, it is not limited to this. As a downstream SINR in a mobile station can be converted into a throughput, the determination can be made by comparing an average throughput with the reference value.

(2) Second Embodiment

A mobile communication system according to a second embodiment is explained below.

As compared with the mobile communication system according to the first embodiment, the mobile communication system according to the present embodiment is intended not to deteriorate the accuracy of determination of whether to start or end the execution of the optimization algorithm for optimization of a transmission parameter of a base station as an operation period of the system is longer. As the operation period of the system is longer, the radio propagation environment in a cell is altered by a change of a path loss due to, for example, the construction of a new building or the demolition of an old building as compared with that is at the cell design. Therefore, it is preferable to adjust a reference value for the determination of whether to start or end the execution of the optimization algorithm for optimization of a transmission parameter of a base station according to a change in the radio propagation environment.

Incidentally, the configurations illustrated in FIGS. 1 to 4 can be applied to configurations of the system, a base station, and an EMS according to the present embodiment.

Figure 6:
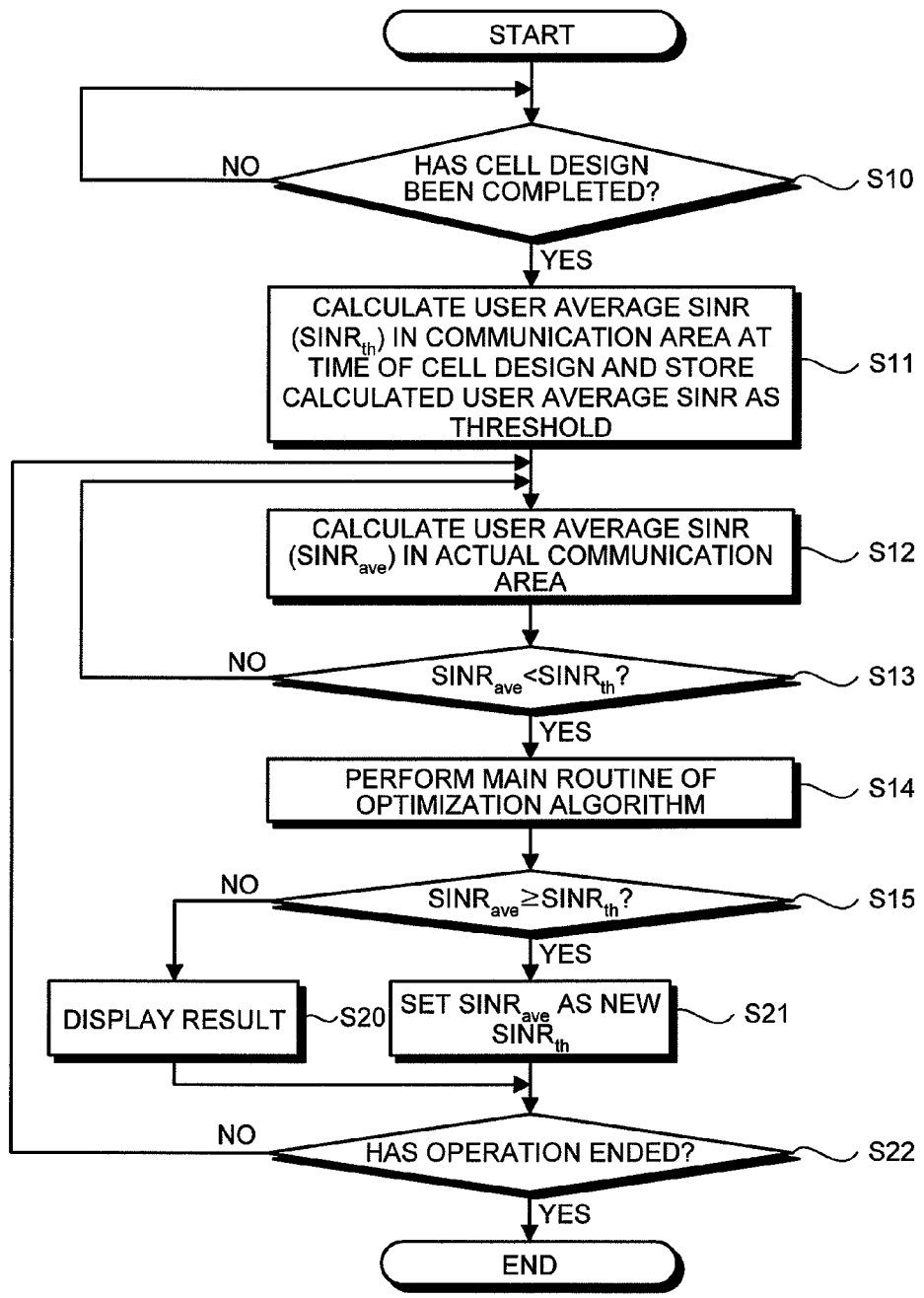
FIG. 6 is a flowchart illustrating operation related to the execution of the optimization algorithm for optimization of an antenna tilt angle of a base station according to a second embodiment.

An example of operation related to the execution of the optimization algorithm for optimization of an antenna tilt angle of a base station out of operations of the EMS according to the present embodiment is explained with reference to FIG. 6. FIG. 6 is a flowchart illustrating the operation related to the execution of the optimization algorithm for optimization of an antenna tilt angle of a base station. Incidentally, in the flowchart illustrated in FIG. 6, Steps S10 to S15 are identical to those illustrated in FIG. 5, so processes at Steps S15 and later are explained.

At Step S15, when having completed a main-routine process of the optimization algorithm once, the EMS determines whether to start the main-routine process again or to end the execution of the optimization algorithm. At this time, when it is determined that the average SINR is lower than the reference value ($SINR_{ave} < SINR_{th}$), the EMS displays a result of the process of the optimization algorithm (a result indicating that an SINR is not improved) on the display device 26 (Step S20). In the flowchart illustrated in FIG. 6, the result is displayed if an SINR is not improved by the execution of one-time main-routine process; alternatively, the result can be displayed if an SINR is not improved by the execution of the main-routine process one or more times that one desires. As a result of the process of the optimization algorithm, if an average SINR is not improved, the radio propagation environment in the communication area could be deteriorated as compared with that is at the initial cell design. Therefore, through Step S20, the result is recognized by an operator of the EMS. This helps the operator to take measures, such as review of the cell design.

On the other hand, at Step S15, when it is determined that the average SINR is equal to or higher than the reference value ($SINR_{th}$) ($SINR_{ave} \geq SINR_{th}$), the EMS sets the average SINR ($SINR_{ave}$) obtained at Step S12 as a new reference value, i.e., a new $SINR_{th}$ (Step S21). After that, as long as the operation is continued (NO at Step S22), the EMS ends the execution of the optimization algorithm without continuously performing the main-routine process, and returns to Step S12. Then, the EMS continues the monitoring by determination based on an average SINR.

As a result of the process of the optimization algorithm, if the average SINR is improved, the radio propagation environment in the communication area could be improved as compared with that is at the initial cell design. Therefore, in such a case, the reference value is updated according to the improved radio propagation environment. Consequently, the subsequent determination of the condition to start the execution of the optimization algorithm (Step S13) is made properly.

Incidentally, in the same manner as in the first embodiment, one-time main routine of the above-described optimization algorithm could require a long time, for example, about a few hours; therefore, the EMS can be configured to check whether the condition at Step S13 is met or not during the execution of the main routine. In this case, when the condition at Step S13 is not met, the execution of the main routine is aborted.

As described above, in the mobile communication system according to the present embodiment, a reference value for determination of whether to start or end the execution of the optimization algorithm for optimization of a transmission parameter of a base station is adjusted according to a change in the radio propagation environment; therefore, it is possible to keep the reference value to an appropriate value.

(3) Third Embodiment

A mobile communication system according to a third embodiment is explained below.

Incidentally, the configurations illustrated in FIGS. 1 to 4 can be applied to configurations of the system, a base station, and an EMS according to the present embodiment.

As compared with the mobile communication system according to the first or second embodiment, the mobile communication system according to the present embodiment is intended to further improve the accuracy of determination of whether to start or end the execution of the optimization algorithm for optimization of a transmission parameter of a base station. To improve the accuracy of the determination, in the present embodiment, the average reception quality is calculated when the number of mobile stations of which the UE information can be obtained at the determination is equal to or more than a predetermined threshold. Namely, when the number of mobile stations connected to the base station is high, for example, in the daytime hours of the day, the number of mobile stations connected to base stations in a communication area is higher and also the mobile stations are more likely to be evenly dispersed on the whole as compared with in the nighttime hours of the day. Therefore, by calculating the average reception quality when the number of mobile stations connected to the base station is high, the accuracy of the determination is improved.

Figure 7:
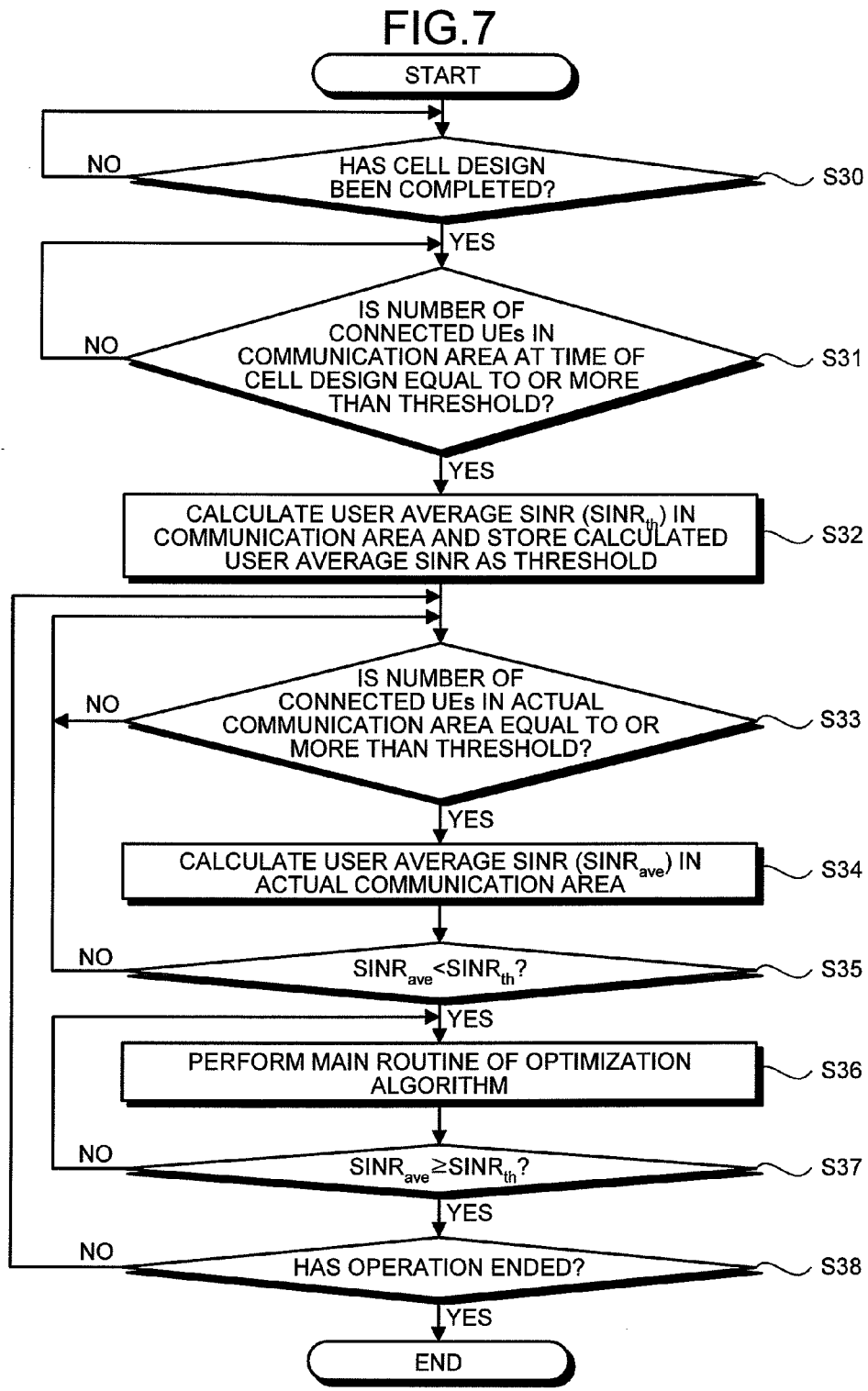
FIG. 7 is a flowchart illustrating operation related to the execution of the optimization algorithm for optimization of an antenna tilt angle of a base station according to a third embodiment.

Subsequently, an example of operation related to the execution of the optimization algorithm for optimization of an antenna tilt angle of a base station out of operations of the EMS according to the present embodiment is explained with reference to FIG. 7. FIG. 7 is a flowchart illustrating the operation related to the execution of the optimization algorithm for optimization of an antenna tilt angle of a base station.

In FIG. 7, upon completion of the cell design (Step S30), cell alignment in a communication area and an initial value of a transmission parameter of each base station in the communication area are set for the operation of the mobile communication system. Furthermore, at this point, under a condition that the number of mobile stations UE connected to the base station is equal to or more than a threshold (a first threshold) (Step S31), a reference value for determination of whether to start or end the execution of the antenna-tilt-angle optimization algorithm has been set in each base station (Step S32). The above processes are typically performed before the mobile communication system is operated on an actual field.

When the operation of the mobile communication system according to the present embodiment is started on the actual field, the EMS first determines whether the number of mobile stations UE connected to the base station is equal to or more than the threshold (Step S33). When the number of mobile stations UE connected to the base station is equal to or more than the threshold, the EMS calculates an average SINR (SINR$_{ave}$) of mobile stations in the communication area (Step S34). At Step S35, when it is determined that the average SINR is equal to or higher than the reference value (SINR$_{th}$) (SINR$_{ave}$≥SINR$_{th}$), the EMS returns to Step S33 without performing the optimization of the antenna tilt angle of the base station, and continues the monitoring by determination based on an average SINR.

On the other hand, at Step S35, when it is determined that the average SINR is lower than the reference value (SINR$_{ave}$<SINR$_{th}$), the EMS performs a main-routine process of the optimization algorithm for optimization of the antenna tilt angle of the base station (Step S36). Then, when having completed the main-routine process of the optimization algorithm once, the EMS determines whether to start the main-routine process again or to end the execution of the optimization algorithm (Step S37). Namely, when it is determined that the average SINR is lower than the reference value (SINR$_{ave}$<SINR$_{th}$), the EMS returns to Step S36, and again performs the main-routine process of the optimization algorithm for optimization of the antenna tilt angle of the base station. When it is determined that the average SINR is equal to or higher than the reference value (SINR$_{th}$) (SINR$_{ave}$≥SINR$_{th}$), as long as the operation is continued (NO at Step S38), the EMS ends the execution of the optimization algorithm without continuously performing the main-routine process, and returns to Step S33. Then, the EMS continues the monitoring by determination based on an average SINR.

Incidentally, one-time main routine of the above-described optimization algorithm could require a long time, for example, about a few hours; therefore, the EMS can be configured to check whether the conditions at Steps S33 and S35 are met or not during the execution of the main routine. In this case, when the conditions at Steps S33 and S35 are not met, the execution of the main routine is aborted.

As described above, in the mobile communication system according to the present embodiment, when the number of mobile stations connected to base stations in a communication area is high, whether to start or end the execution of the optimization algorithm for optimization of a transmission parameter of a base station is determined. Consequently, the accuracy of the determination is further improved as compared with the first or second embodiment.

(4) Fourth Embodiment

A mobile communication system according to a fourth embodiment is explained below.

Incidentally, the configurations illustrated in FIGS. 1 to 4 can be applied to configurations of the system, a base station, and an EMS according to the present embodiment.

As compared with the mobile communication systems according to the first to third embodiments, the mobile communication system according to the present embodiment is intended to further improve the accuracy of determination of whether to start or end the execution of the optimization algorithm for optimization of a transmission parameter of a base station. To improve the accuracy of the determination, in the present embodiment, in addition to the condition that the number of mobile stations of which the UE information can be obtained at the determination is equal to or more than a predetermined threshold, a distribution of mobile stations in a cell is considered.

Figure 8:
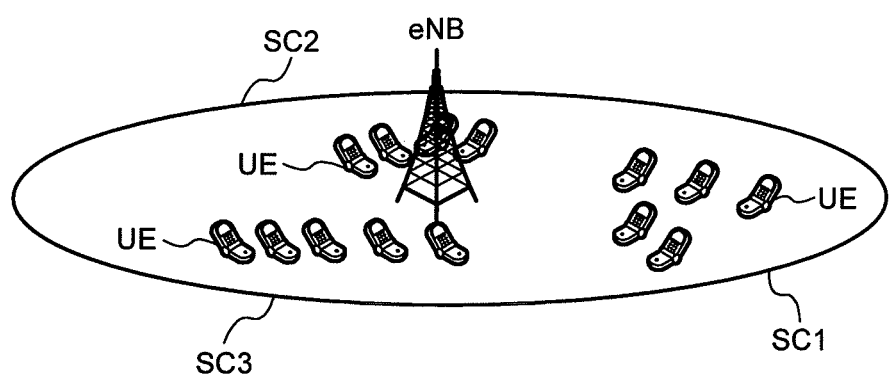
FIG. 8 is a diagram for explaining a reason to consider a distribution of mobile stations in a fourth embodiment.

The reason to consider a distribution of mobile stations is explained below with reference to FIG. 8. In FIG. 8, there may arise a situation where at a sector SC1 in a single base station, many mobile stations UE are distributed at the cell edge; at a sector SC2, many mobile stations UE are distributed near the base station; at a sector SC3, many mobile stations UE are distributed in the center of the cell. Under such a situation, there may be a circumstance in which the average reception quality of the entire cell that the base station covers is almost identical to the average reception quality in a situation where mobile stations UE are evenly distributed in the entire cell. This is true for the entire communication area. Namely, in terms of individual sectors, it may be inappropriate to perform the above-described determination based on only the average reception quality of the entire communication area. For example, in FIG. 8, mobile stations are unevenly distributed in the sectors SC1 and SC2, and this distribution is not appropriate to execute the optimization algorithm accurately; and yet despite this, as the average reception quality of the entire communication area is equal to or more than the reference value SINR$_{th}$, the execution of the optimization algorithm can be started. In the mobile communication system according to the present embodiment, to avoid such inappropriate execution of the optimization algorithm, a distribution of mobile stations on a per-sector basis is considered.

Specifically, the following process is performed.

First, it is assumed that i base stations each has j sectors, and k[i][j] mobile stations are connected to each sector, and a downstream reception SINR of each mobile station is an SINR[i][j][k]. Then, the EMS counts the number of mobile stations of which the reception SINR exceeds a predetermined threshold out of mobile stations connected to base stations in a communication area. This threshold is, for example, a value of an average reception SINR obtained when the mobile stations are evenly distributed in the communication area, which has been calculated by a computer in advance, or a value obtained by statistical processing reception SINRs received from the mobile stations over a long period. The radio propagation environment differs according to sector, so it is preferable to set the threshold on a per-sector basis. Therefore, the EMS calculates N$_{UE}$[1] as the number of mobile stations meeting SINR[i][j][k]≥SINR$_{th}$[i][j], where a threshold of a sector is denoted by SINR$_{th}$[i][j]. Furthermore, on a per-sector basis, the EMS calculates a ratio R of the number of mobile stations meeting a reception SINR equal to or higher than the threshold SINR$_{th}$[i][j] to the total number of mobile stations in the sector in accordance with the following equation (2).

$$R = \frac{N_{UE}[l]}{k[i][j]} \qquad (2)$$

If this ratio R is, for example, around 0.5 (for example, 0.4<R<0.6), there exist about the same number of mobile stations of which the reception SINR is lower than the average SINR and mobile stations of which the reception SINR is higher than the average SINR, and it is considered that the mobile stations are relatively evenly distributed in the sector. At this time, it is preferable to add a condition that the number k[i][j] of mobile stations connected to a base station in each sector is equal to or more than a predetermined number N$_{th}$. This helps to determine that relatively many users are evenly distributed in the sector. Then, at each sector in all base stations, determination of whether the above-described conditions of the ratio R and the number k[i][j] of mobile stations are met is considered in the determination of whether to start or end the execution of the optimization algorithm for optimization of a transmission parameter of a base station. The above process is performed by the control unit 21 (see FIG. 4) of the EMS.

Figure 9:
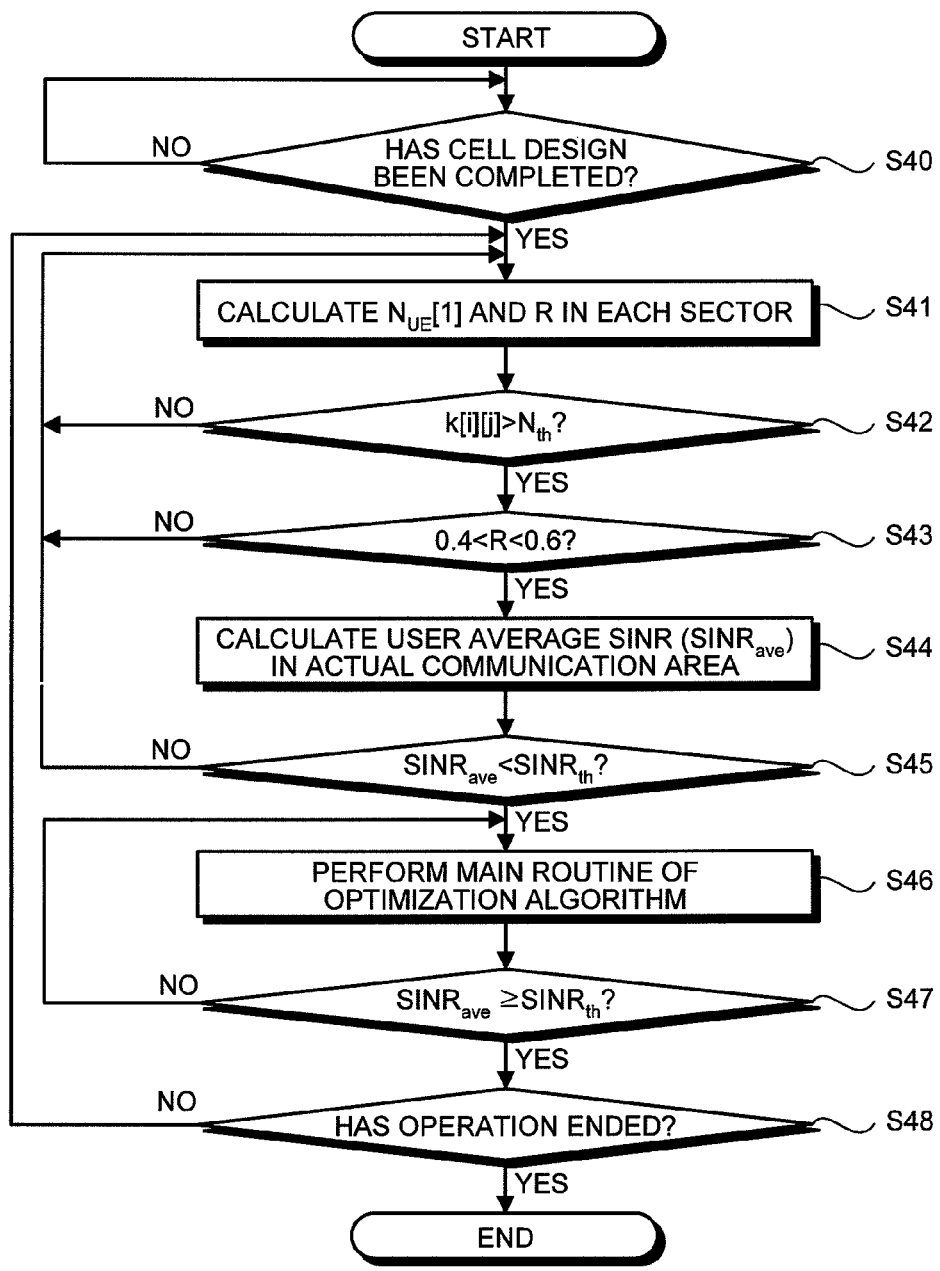
FIG. 9 is a flowchart illustrating operation related to the execution of the optimization algorithm for optimization of an antenna tilt angle of a base station according to the fourth embodiment.

Subsequently, an example of operation related to the execution of the optimization algorithm for optimization of an antenna tilt angle of a base station out of operations of the EMS according to the present embodiment is explained with reference to FIG. 9. FIG. 9 is a flowchart illustrating the operation related to the execution of the optimization algorithm for optimization of an antenna tilt angle of a base station.

In FIG. 9, upon completion of the cell design (Step S40), cell alignment in a communication area and an initial value of a transmission parameter of each base station in the communication area are set for the operation of the mobile communication system. Furthermore, at this point, a reference value for determination of whether to start or end the execution of the antenna-tilt-angle optimization algorithm has been set in each base station. The above processes are typically performed before the mobile communication system is operated on an actual field.

When the operation of the mobile communication system according to the present embodiment is started on the actual field, the EMS calculates $N_{UE}[1]$ and a ratio R as described above (Step S41). Namely, the EMS calculates $N_{UE}[1]$ as the number of mobile stations meeting $SINR[i][j][k] \geq SINR_{th}[i][j]$, where a threshold of a sector is denoted by $SINR_{th}[i][j]$ (a third threshold). Furthermore, on a per-sector basis, the EMS calculates a ratio R of the number of mobile stations meeting a reception SINR equal to or higher than the threshold $SINR_{th}[i][j]$ to the total number of mobile stations at a sector. Then, the EMS determines whether the number $k[i][j]$ of mobile stations connected to a base station in the sector is equal to or more than a predetermined number $N_{th}$ (a second threshold) (Step S42), and also determines whether the ratio R is within a range of 0.4 to 0.6 (a predetermined range set to around 0.5 (a first range)) (Step S43). The determination at Steps S42 and S43 is made on a per-sector basis with respect to each of all base stations in the communication area, and only when all sectors meet the conditions, the EMS proceeds to Step S44. Proceeding to Step S44 means relatively many users are evenly distributed at all the sectors in the communication area.

After that, the same processes as the above-described Steps S12 to S15 in FIG. 5 are performed.

Namely, first, the EMS calculates an average SINR ($SINR_{ave}$) of mobile stations in the communication area (Step S44). At Step S45, when it is determined that the average SINR is equal to or higher than a reference value ($SINR_{th}$) ($SINR_{ave} \geq SINR_{th}$), the EMS returns to Step S41 without performing the optimization of the antenna tilt angle of the base station.

On the other hand, at Step S45, when it is determined that the average SINR is lower than the reference value ($SINR_{ave} < SINR_{th}$), the EMS performs a main-routine process of the optimization algorithm for optimization of the antenna tilt angle of the base station (Step S46). Then, when having completed the main-routine process of the optimization algorithm once, the EMS determines whether to start the main-routine process again or to end the execution of the optimization algorithm (Step S47). Namely, when it is determined that the average SINR is lower than the reference value (NO at Step S47), the EMS returns to Step S46, and again performs the main-routine process of the optimization algorithm for optimization of the antenna tilt angle of the base station. When it is determined that the average SINR is equal to or higher than the reference value ($SINR_{th}$) (YES at Step S47), as long as the operation is continued (NO at Step S48), the EMS ends the execution of the optimization algorithm without continuously performing the main-routine process, and returns to Step S41.

Incidentally, one-time main routine of the above-described optimization algorithm could require a long time, for example, about a few hours; therefore, the EMS can be configured to check whether the conditions at Steps S42, S43, and S45 are met or not during the execution of the main routine. In this case, when the conditions at Steps S42, S43, and S45 are not met, the execution of the main routine is aborted.

As described above, in the mobile communication system according to the present embodiment, a distribution of mobile stations in each sector of a base station is considered in the determination of whether to start or end the execution of the optimization algorithm for optimization of a transmission parameter of the base station. Consequently, the accuracy of the determination of whether to start or end the execution of the optimization algorithm is further improved as compared with the first to third embodiments.

(5) Fifth Embodiment

A mobile communication system according to a fifth embodiment is explained below.

Incidentally, the configurations illustrated in FIGS. 1 to 4 can be applied to configurations of the system, a base station, and an EMS according to the present embodiment.

As the first to fourth embodiments, various forms of determination of whether to start or end the execution of the optimization algorithm for optimization of a transmission parameter of a base station are described above. By setting the determination, the optimization algorithm is executed under favorable conditions for accurate execution of the optimization algorithm. However, on an actual field, an adjustment mount of a transmission parameter which does not reflect the actual circumstances, for example, due to a change in the distribution of mobile stations being in execution of the optimization algorithm or the like could be calculated. Therefore, in the present embodiment, an upper limit is set on an adjustment mount of a transmission parameter obtained by the execution of the optimization algorithm. This limits an adjustment mount of a transmission parameter, and therefore, it is possible to avoid calculating an adjustment mount of a transmission parameter which does not reflect the actual circumstances. Furthermore, by limiting an adjustment mount of a transmission parameter, a calculation convergence time of the optimization algorithm is reduced, and the adjustment mount of the transmission parameter is calculated promptly.

Figure 10:
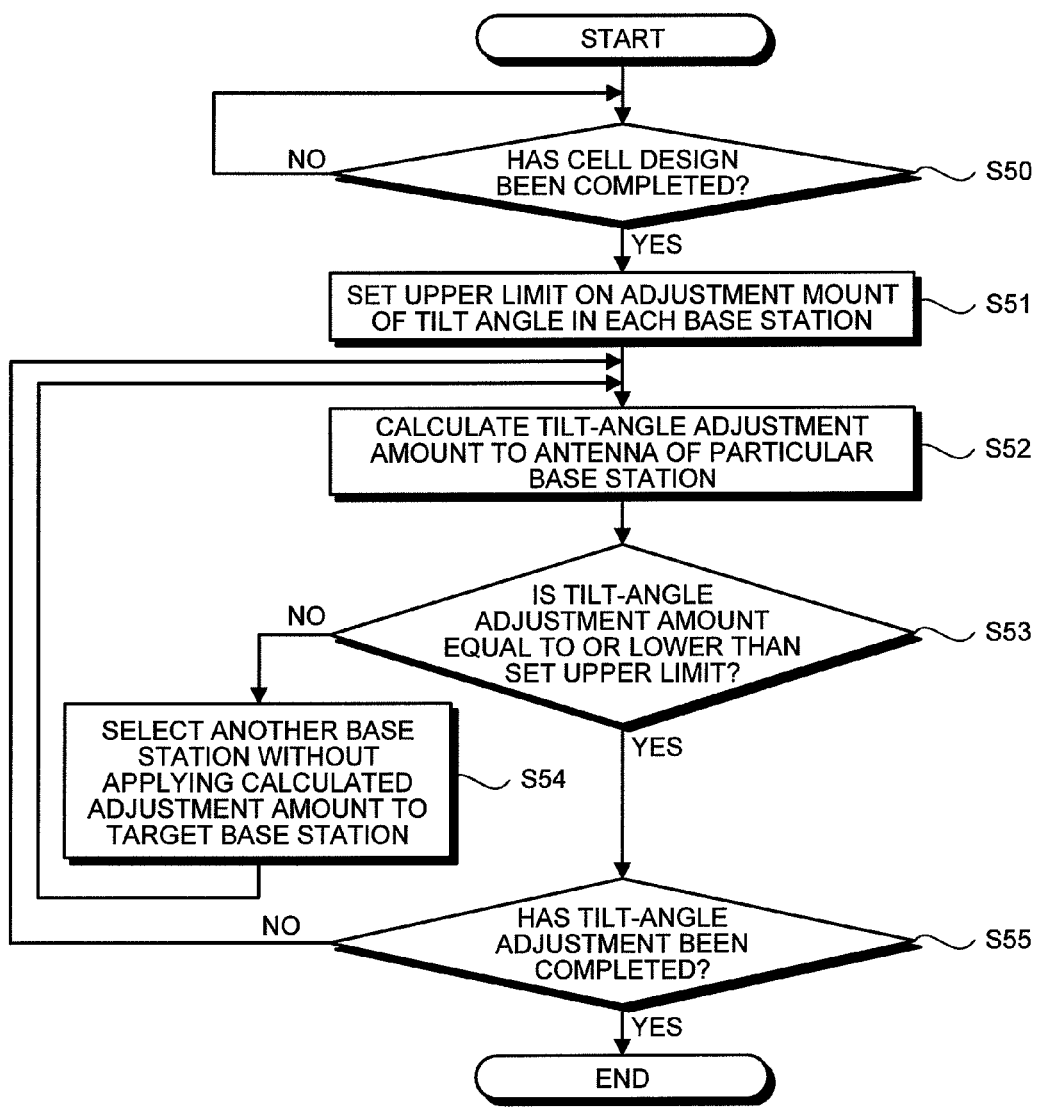
FIG. 10 is a flowchart illustrating operation related to the execution of the optimization algorithm for optimization of an antenna tilt angle of a base station according to a fifth embodiment.

An example of operation related to the execution of the optimization algorithm for optimization of an antenna tilt angle of a base station out of operations of the EMS according to the present embodiment is explained with reference to FIG. 10. FIG. 10 is a flowchart illustrating the operation related to the execution of the optimization algorithm for optimization of an antenna tilt angle of a base station.

In FIG. 10, upon completion of the cell design (Step S50), cell alignment in a communication area and an initial value of a transmission parameter (in the present embodiment, an antenna tilt angle) of each base station in the communication area are set for the operation of the mobile communication system. Furthermore, the EMS sets an upper limit on an adjustment mount of a tilt angle in each base station. For example, a predetermined value, such as ±3 degrees, is set as an upper limit (Step S51).

After Step S51, as described above in the first to fourth embodiments, through the determination of, for example, whether to start the execution of the optimization algorithm for optimization of the transmission parameter of the base station, the execution of the optimization algorithm is started. Steps S52 to S55 describe an outline of a main-routine process of the optimization algorithm. As already described above, any optimization algorithm can be applied; however, in general, most optimization algorithms are configured to promote overall optimization of a throughput of the entire communication area by sequentially changing respective tilt angles on a per base station basis. FIG. 10 is based on the assumption that tilt angles are sequentially changed on a per base station basis.

At Step S52 in FIG. 10, targeting a particular base station, the EMS performs a tilt-angle adjustment process and calculates an adjustment amount of an antenna of the base station. If the calculated antenna adjustment amount is equal to or lower than the upper limit set at Step S51, the EMS fixes the adjustment amount of the tilt angle to the antenna, and continues the subsequent process if appropriate (Step S55). On the other hand, at Step S53, if the calculated antenna adjustment amount exceeds the upper limit set at Step S51, the EMS does not set the adjustment amount to the target base station, and selects another base station to adjust a tilt angle (Step S54), and then returns to Step S52.

(Variation 1)

An upper limit on an adjustment amount of a transmission parameter can be set as a fixed value; alternatively, an upper limit can be set to vary according to the number k[i][j] of mobile stations in each sector and a ratio R on a per-sector basis. The following Table 1 illustrates an example of a set upper limit on an adjustment amount of a transmission parameter according to the number k[i][j] of mobile stations and a ratio R. In Table 1, an upper limit on an adjustment amount of an antenna tilt angle is illustrated as a transmission parameter. For example, an upper limit on an adjustment amount is 2 degrees, which indicates that ±2 degrees from an initial value of an antenna tilt angle is a range of adjustment amount.

TABLE 1

|  | k[i][j] | | |
| --- | --- | --- | --- |
| R | Less than 50 | 50 to 200 | More than 200 |
| 0 to 0.4 | 2 deg | 3 deg | 3 deg |
| 0.4 to 0.6 | 4 deg | 6 deg | 8 deg |
| 0.6 to 1.0 | 2 deg | 3 deg | 3 deg |

As illustrated in Table 1, as the number k[i][j] of mobile stations in a sector gets larger, an adjustment amount obtained by the optimization algorithm is determined to be more accurate, and a higher adjustment amount is allowed. Furthermore, when a ratio R (a ratio of mobile stations at which a reception SINR as an index value becomes a predetermined fourth threshold) in the sector is a predetermined median value (0.4 to 0.6; a second range), a distribution of the mobile stations in the sector is more even than that is when the ratio R is not the median value, and an adjustment amount obtained by the optimization algorithm is determined to be more accurate, and a higher adjustment amount is allowed. Incidentally, criterion of the number k[i][j] of mobile stations and a ratio R and upper limits illustrated in Table 1 are just examples; needless to say, in the actual application, they can be arbitrarily set according to the radio propagation environment of the mobile communication system and the like.

(Variation 2)

In the variation 1, an upper limit on an adjustment amount of a tilt angle is set based on a predetermined initial value determined, for example, at the stage of the cell design; alternatively, the upper limit can be set based on a value of tilt angle before an adjustment amount is calculated. This is because in the long-term system operation, an initial value determined at the stage of the cell design is not always an appropriate median value, and it is preferable to set the upper limit based on a tilt angle at the time of calculation of an adjustment amount according to a change in the radio propagation environment. In this case, an adjustment amount can be determined by only the number k[i][j] of mobile stations in a sector as illustrated in the following Table 2, or an adjustment amount can be determined by only a ratio R in a sector as illustrated in the following Table 3.

TABLE 2

| k[i][j] | | |
| --- | --- | --- |
| Less than 50 | 50 to 200 | More than 200 |
| 4 deg | 6 deg | 8 deg |

TABLE 3

| R | | |
| --- | --- | --- |
| 0 to 0.4 | 0.4 to 0.6 | 0.6 to 1.0 |
| 3 deg | 6 deg | 3 deg |

As described above, in the mobile communication system according to the present embodiment, an upper limit is set on an adjustment mount of a transmission parameter (in the above-described example, an antenna tilt angle) obtained by the execution of the optimization algorithm. This limits an adjustment mount of a transmission parameter, and therefore, it is possible to avoid making an adjustment based on an adjustment mount of a transmission parameter which does not reflect the actual circumstances. Furthermore, by limiting an adjustment mount of a transmission parameter, a calculation convergence time of the optimization algorithm can be reduced.

(6) Sixth Embodiment

A mobile communication system according to a sixth embodiment is explained below.

(6-1) Mobile Communication System

In the mobile communication system according to the above-described first embodiment, whether to start or end the execution of the optimization algorithm is determined by comparing an average SINR obtained by averaging downstream SINRs as UE information with a reference value. In the mobile communication system according to the present embodiment, whether to start or end the execution of the optimization algorithm is determined by comparing a change amount of an average RSRP obtained by averaging RSRP (Reference Signal Received Power) when a radio link failure (hereinafter, simply referred to as an "RLF") has occurred with a reference value. Incidentally, the RSRP is a value of received power in a mobile station UE in response to a known reference signal transmitted from a base station eNB.

The mobile communication system according to the present embodiment is further explained with reference to FIGS. 11A and 11B.

Figure 11A:
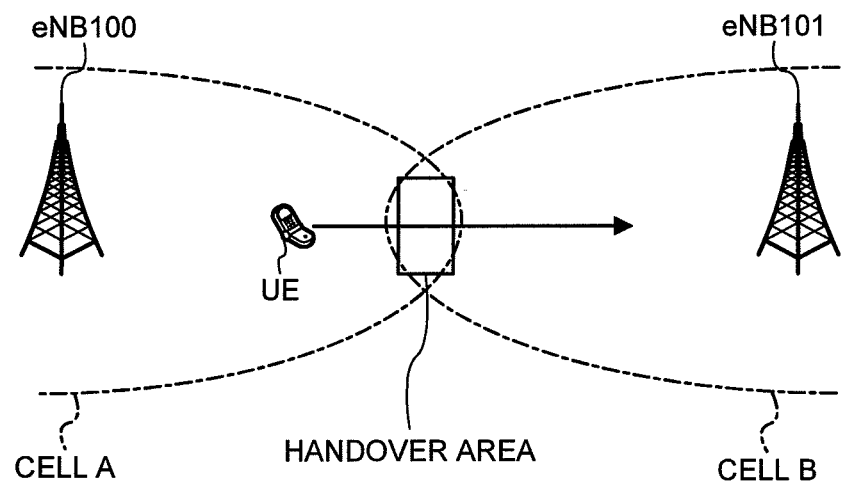
FIGS. 11A and 11B are diagrams illustrating an example of a mobile communication system according to a sixth embodiment.
Figure 11B:
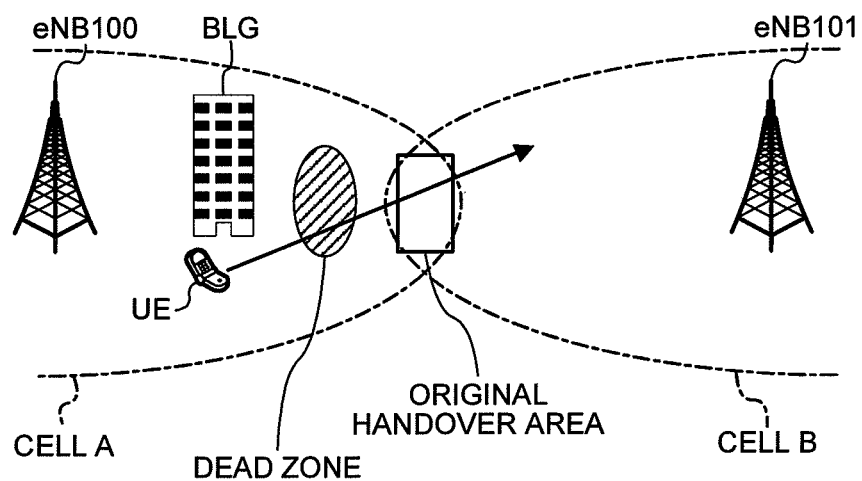

FIGS. 11A and 11B illustrate a mobile communication system including a base station eNB100 forming a cell A and a base station eNB101 forming a cell B, which are adjacent to each other, and indicates a situation where a mobile station UE is handed over from the cell A to the cell B. In FIGS. 11A and 11B, FIG. 11A indicates a state before a particular dead zone is developed, and FIG. 11B indicates a state after the particular dead zone is developed.

In FIG. 11A, the mobile station UE monitors the received signal strength or RSRP obtained from a reference signal from the base station eNB or an SINR, and is handed over in a handover area. On the other hand, in FIG. 11B, a dead zone is developed because a building BLD, which did not exist at the cell design, has been newly built in the cell A, and therefore, the received signal strength or RSRP has considerably deteriorated even in an area which does not require the handover originally, resulting in the occurrence of RLF. Consequently, it is conceivable that the mobile station UE is forced to be reconnected to an adjacent cell (the cell B). Here, in the mobile station UE just before entering the dead zone, the received signal strength or RSRP from the base station eNB100 has not deteriorated enough to cause the handover; therefore, it is considered that the received signal strength or RSRP deteriorates enough to suddenly cut the link once the mobile station UE enters the dead zone. After that, the mobile station UE can be reconnected to the base station eNB101 if the received signal strength or RSRP from the base station eNB101 meets the condition.

Namely, the adjacent cells periodically monitor an average RSRP of the mobile station UE just before the occurrence of RLF, and if a change amount of RSRP is large, it can be determined that there is a change in the radio propagation environment. For example, when the average RSRP gets larger with time, it is considered that a tendency to interrupt the link is increased even in a case of good RSRP which does not require the handover originally, and it is appropriate to start the antenna-tilt-angle optimization algorithm to correct the cause. Incidentally, when the optimization algorithm is executed, in the example illustrated in FIG. 11B, an adjustment to expand a cell edge of the cell B toward the cell A, i.e., control to reduce the tilt angle of the antenna of the base station eNB101 is made.

(6-2) Schematic Configuration of Mobile Station

Figure 12:
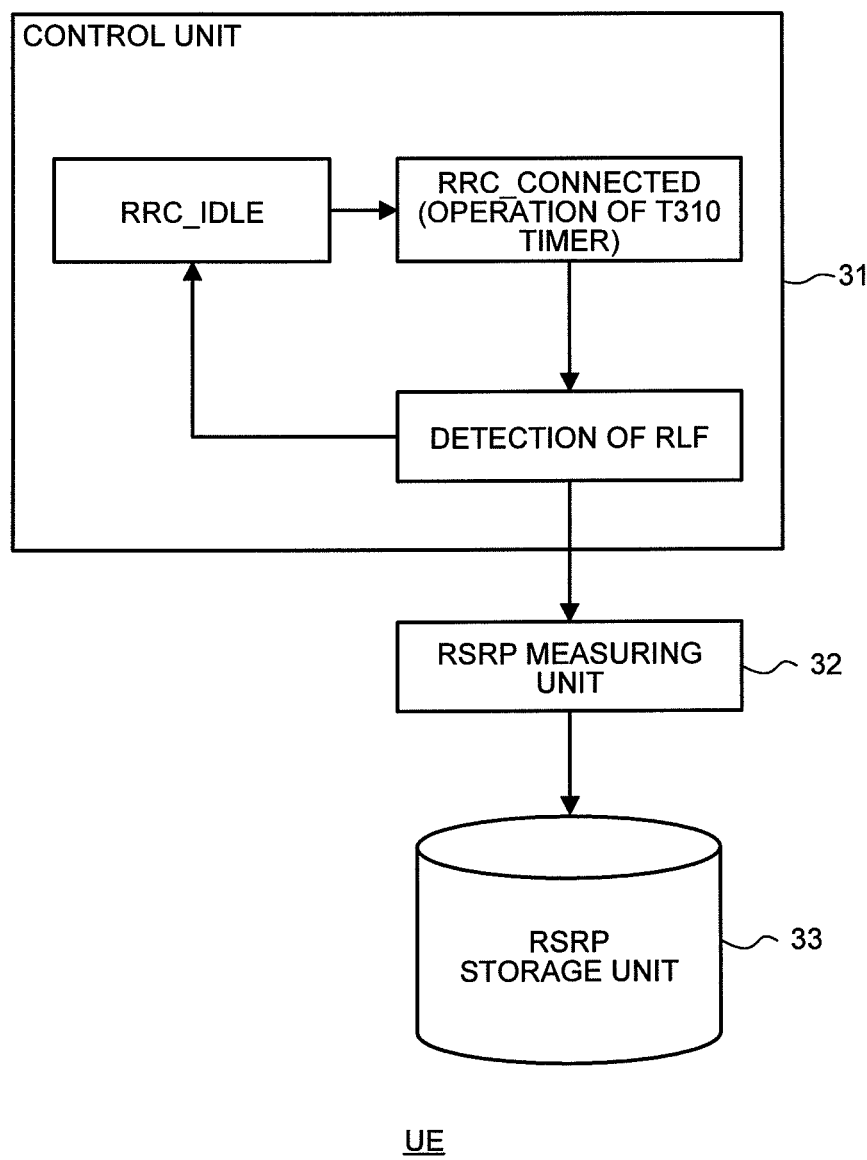
FIG. 12 is a block diagram illustrating a main section of a mobile station according to the sixth embodiment.

FIG. 12 is a block diagram illustrating a main section of a mobile station UE according to the present embodiment. In FIG. 12, a control unit 31 operates in accordance with the internal state transition illustrated in FIG. 12. Namely, in a state where an RRC connection is established (RRC_CONNECTED), when having detected quality deterioration of a radio link between the mobile station UE and a connected base station eNB, the control unit 31 starts up a timer T310. If the quality deterioration of the radio link is not recovered before the expiry of the timer T310, the control unit 31 detects an RLF and makes the transition to an idle state (RRC_IDLE). In the idle state (RRC_IDLE), a cell selecting process is performed, and when a particular cell has been detected, establishment of a radio link to a base station eNB forming the cell is made. When the radio link is established, the state transition to RRC_CONNECTED is made.

An RSRP measuring unit 32 periodically measures received power of a reference signal from a connected base station eNB. When the control unit 31 has detected an RLF, the RSRP measuring unit 32 records a value of received power measured just before the detection (a value of the latest sample prior to the detection of the RLF; i.e., "RSRP at the occurrence of RLF") on an RSRP storage unit 33. Incidentally, it is preferable to record the record of the RSRP at the occurrence of the RLF to be associated with an adjacent cell (for example, cell A→cell B in the example in FIGS. 11A and 11B).

(6-3) Operations of Base Station and EMS

In the mobile communication system according to the present embodiment, each base station eNB transmits RSRP at the occurrence of RLF as UE information of a connected mobile station UE to the EMS. The EMS collects UE information (RSRP at the occurrence of RLF) transmitted from each base station eNB in a communication area, and periodically calculates average RSRP by averaging the collected UE information, for example, on a daily or monthly basis. The following Table 4 illustrates an example of average RSRP [dB] calculated on a monthly basis by the EMS. Preferably, such hourly average RSRP is calculated to be associated with an adjacent cell.

TABLE 4

| Year | January | February | March | April | May | June | July | August | September | October | November | December |
|---|---|---|---|---|---|---|---|---|---|---|---|---|
| 2008 | −0.3 | — | — | −0.5 | — | — | — | — | — | — | 0.7 | 0.2 |
| 2009 | 0.9 | 0.5 | 0.5 | 0.9 | 1.2 | 0.9 | 1.6 | 2.1 | 1.8 | 2.3 | 2.8 | 4.1 |
| 2010 | 3.6 | 3.9 | 4.3 | 3.9 | 5.0 | | | | | | | |

For example, when data in Table 4 is calculated to be associated with a particular adjacent cell, for example, cell A→cell B, "-" in the table indicates that there is no reconnection from the cell A to the cell B due to an RLF. The EMS compares, for example, a change amount of yearly average RSRP (for example, in Table 4, 1.2 dB between May 2008 and May 2009, 3.8 dB between May 2009 and May 2010) with a reference value, and if the change amount is larger than the reference value, the EMS starts the execution of the optimization algorithm. As a matter of course, an object to be compared with a reference value is not limited to a yearly average amount, and can be a change amount in an arbitrary predetermined period (for example, one month). Furthermore, a condition to start the optimization algorithm can be when a change amount of any adjacent cell in the communication area exceeds the reference value or when respective change amounts of all adjacent cells in the communication area all exceed the reference value. Incidentally, the flow illustrated in FIG. 5 can be applied to the whole flow performed by the EMS according to the present embodiment just by replacing the SINR with the above-described RSRP at the occurrence of RLF.

The embodiments of the present invention are described in detail above; however, a communication device, service-area adjusting method, and mobile communication system according to the present invention are not limited to the above embodiments, and it is obvious that various modification and changes can be made without departing from the scope of the present invention.

According to a communication device, service-area adjusting method, and mobile communication system disclosed herein, it is possible to accurately perform arithmetic processing of a transmission parameter on an actual field.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication device for adjusting a service area of a mobile communication to a mobile station in a predetermined communication area including a plurality of base stations that adjust a transmission-parameter, the communication device comprising:
    a data acquiring unit that acquires an index value indicating downstream reception quality of a mobile station in the predetermined communication area from the mobile station via a base station in the predetermined communication area with respect to each mobile station; and
    a determining unit that determines whether to start or end an execution of arithmetic processing of a transmission parameter of each base station in the communication area by comparing a value based on at least any of a communication quality between the base station and the mobile station in the communication area, throughput, and received power, which is obtained based on the index value of each mobile station that include said mobile station, with a reference value, wherein
    the execution of the arithmetic processing comprises adjusting the service area to the mobile station in the predetermined communication area that includes the plurality of base stations, wherein
    the determining unit applies a start of an execution of optimization algorithm on a condition that an average reception quality of mobile stations in the predetermined communication area has deteriorated to below the reference value; and applies an end of the execution of the optimization algorithm on a condition that the average reception quality of the mobile stations in the predetermined communication area has become equal to or higher than the reference value and a reception quality has been improved so as to determine whether to start or end the execution of the arithmetic processing by using the optimization algorithm.

2. The communication device according to claim 1, wherein
    the reference value is adjusted according to a change in a communication environment in the communication area.

3. The communication device according to claim 1, wherein
    the determining unit further determines whether to start or end the execution of the arithmetic processing depending on whether the number of mobile stations connected to the each base station in the communication area is equal to or more than a predetermined first threshold.

4. The communication device according to claim 3, wherein
    the determining unit further determines whether to start or end the execution of the arithmetic processing depending on whether the number of mobile stations connected to a base station of the plurality of base stations with respect to sectors of the each base station in the communication area is equal to or more than a second threshold and whether a proportion of mobile stations of which the index value is equal to or more than a predetermined third threshold in mobile stations connected to all the base station with respect to sectors is within a predetermined first range.

5. The communication device according to claim 3, wherein
    the determining unit makes the determination based on the number of mobile stations and/or the proportion of mobile stations during the execution of the arithmetic processing, and also determines whether to continue the execution of the arithmetic processing depending on a result of the determination.

6. The communication device according to claim 1, further comprising an adjustment-amount calculating unit that calculates an adjustment amount of the transmission parameter of each of the plurality of base stations in the communication area based on a result of the execution of the arithmetic processing, wherein
    an upper limit is set on the adjustment amount.

7. The communication device according to claim 6, wherein
    the upper limit on the adjustment amount of the transmission parameter of each of the plurality of base stations is set to high depending on the number of mobile stations connected to the base station with respect to sectors.

8. The communication device according to claim 6, wherein
    the upper limit on the adjustment amount of the transmission parameter of the each base station, when a proportion of the mobile stations of which the index value is equal to or more than a predetermined fourth threshold in the mobile stations connected to the base station with respect to each sector is within a predetermined second range, the upper limit is set to be higher than the upper limit when the proportion is not within the second range.

9. The communication device according to claim 1, wherein
    the received power is received power of a reference signal in the mobile station at an occurrence of a radio link failure.

10. A service-area adjusting method for adjusting a service area of a mobile communication to a mobile station in a predetermined communication area including a plurality of base stations that adjust a transmission-parameter, the service-area adjusting method comprising:
    acquiring an index value indicating downstream reception quality of a mobile station in the predetermined communication area from the mobile station via a base station in the predetermined communication area with respect to mobile stations that include said mobile station; and
    determining whether to start or end an execution of arithmetic processing of a transmission parameter of each base station of the plurality of base stations in the communication area by comparing a value based on at least any of a communication quality between the base station and the mobile station in the communication area, throughput, and received power, which is, obtained based on the index value of each of the mobile stations, with a reference value, wherein
    the execution of the arithmetic processing comprises adjusting the service area to the mobile station in the predetermined communication area that includes the plurality of base stations wherein
    the determining includes applying the a start of an execution of optimization algorithm on a condition that an average reception quality of the mobile stations in the predetermined communication area has deteriorated to below the reference value; and applying end of the execution of the optimization algorithm on a condition that the average reception quality of the mobile stations in the predetermined communication area has become equal to or higher than the reference value and a reception quality has been improved so as to determine whether to start or end the execution of the arithmetic processing by using the optimization algorithm.

11. A mobile communication system for adjusting a service area of a mobile communication, the mobile communication system comprising:
 a base station;
 a mobile station; and
 a control station for adjusting a service area to a mobile station in a predetermined communication area, wherein
the base station adjusts a transmission-parameter, and
the control station includes:
  a data acquiring unit that acquires an index value indicating downstream reception quality of a mobile station in the predetermined communication area from the mobile station via a base station in the predetermined communication area with respect to mobile stations that include said mobile station; and
  a determining unit that determines whether to start or end an execution of arithmetic processing of a transmission parameter of each base station of a plurality of base stations that include said base station in the communication area by comparing a value based on at least any of a communication quality between the base station and the mobile station in the communication area, throughput, and received power, which is obtained based on the index value of each of the mobile stations, with a reference value, wherein
 the execution of the arithmetic processing comprises adjusting the service area to the mobile station in the predetermined communication area that includes the plurality of base stations, and
 the determining unit applies a start of an execution of optimization algorithm on a condition that an average reception quality of the mobile stations the predetermined communication area has deteriorated to below the reference; value and applies an end of the execution of the optimization algorithm on a condition that the average reception quality of the mobile stations in the predetermined communication area has become equal to or higher than the reference value and a reception quality has been improved so as to determine whether to start or end the execution of the arithmetic processing using the optimization algorithm.

12. The communication device according to claim 1, wherein
 the reference value is set at a start of an operation of a mobile communication system based on a value calculated from an average distribution of the mobile stations in the predetermined communication area by a computer, and is adjusted according to a change in a radio propagation environment in the predetermined communication area.

* * * * *